(12) United States Patent
Chelaidite et al.

(10) Patent No.: US 9,091,313 B2
(45) Date of Patent: Jul. 28, 2015

(54) FULL CONTACT BRAKE

(71) Applicant: Akebono Brake Corporation, Farmington, MI (US)

(72) Inventors: Galus Chelaidite, South Lyon, MI (US); Gang Lou, Rochester, MI (US)

(73) Assignee: AKEBONO BRAKE CORPORATION, Farmington Hills, MI (US)

( * ) Notice: Subject to any disclaimer, the term of this patent is extended or adjusted under 35 U.S.C. 154(b) by 24 days.

(21) Appl. No.: 14/010,917

(22) Filed: Aug. 27, 2013

(65) Prior Publication Data

US 2015/0060216 A1 Mar. 5, 2015

(51) Int. Cl.
F16D 65/18 (2006.01)
F16D 55/00 (2006.01)
F16D 121/04 (2012.01)

(52) U.S. Cl.
CPC ...... F16D 65/186 (2013.01); *F16D 2055/0058* (2013.01); *F16D 2121/04* (2013.01)

(58) Field of Classification Search
CPC ..... F16D 65/18; F16D 65/853; F16D 65/847; F16D 65/123; F16D 65/128; F16D 65/546; F16D 65/54; F16D 65/52; F16D 55/46; F16D 55/2245; F16D 55/2255; F16D 55/06; F16D 55/10; F16D 55/14; F16D 2065/784; F16D 2065/1392; F16D 2065/1368; F16D 2125/36
USPC ........... 188/72.5, 72.2, 72.4, 72.3, 72.7, 72.9, 188/71.6, 216, 218 A, 264 AA, 196 P, 264 E, 188/18 A, 205 R, 228.1, 71.4, 264 CC
See application file for complete search history.

(56) References Cited

U.S. PATENT DOCUMENTS

| | | | | | |
|---|---|---|---|---|---|
| 2,821,273 | A | * | 1/1958 | Eames et al. | 188/264 F |
| 2,925,891 | A | * | 2/1960 | Sanford | 188/358 |
| 3,112,014 | A | * | 11/1963 | Jeffries | 188/196 P |
| 3,348,636 | A | * | 10/1967 | Boyles | 188/72.3 |
| 3,435,936 | A | * | 4/1969 | Warman | 192/113.1 |
| 3,802,539 | A | | 4/1974 | Thiele | |

(Continued)

FOREIGN PATENT DOCUMENTS

WO 98/29671 A1 7/1998
WO 2005/038282 A1 4/2005

(Continued)

*Primary Examiner* — Anna Momper
*Assistant Examiner* — San Aung
(74) *Attorney, Agent, or Firm* — The Dobrusin Law Firm, P.C.

(57) ABSTRACT

A full contact brake comprising: (a) an inboard housing including: an inner and outer seal groove including a seal; (b) an outboard housing including: an inner and outer seal groove including a seal; and (c) a bridge tube between the inboard housing and the outboard housing; wherein the inboard housing, the outboard housing, and the bridge tube form a housing comprising: (i) an inboard piston between the inner and outer seal groove; (ii) an outboard piston between the inner and outer seal groove; and (iii) a rotor between the inboard and outboard piston so that the inboard piston is moved towards an inboard side and the outboard piston is moved towards an outboard side of the rotor; and wherein the seal of the inboard housing forms an interference fit around the respective piston so that rotation of the inboard and outboard piston respectively are substantially prevented during a brake apply.

20 Claims, 5 Drawing Sheets

(56) References Cited

U.S. PATENT DOCUMENTS

| | | | | |
|---|---|---|---|---|
| 3,830,345 | A | * | 8/1974 | Boyles .......................... 188/71.6 |
| 3,952,842 | A | * | 4/1976 | Klaue .......................... 188/71.4 |
| 4,475,632 | A | * | 10/1984 | Feldmann et al. ........... 188/71.4 |
| 6,318,513 | B1 | | 11/2001 | Dietrich et al. |
| 6,443,269 | B1 | * | 9/2002 | Rancourt ................... 188/18 A |
| 2006/0260886 | A1 | | 11/2006 | Erlston |
| 2008/0261773 | A1 | | 10/2008 | Cao et al. |
| 2010/0258387 | A1 | | 10/2010 | Constans |

FOREIGN PATENT DOCUMENTS

| | | |
|---|---|---|
| WO | 2005/038285 A1 | 4/2005 |
| WO | 2005/038287 A1 | 4/2005 |
| WO | 2006/047886 A1 | 5/2006 |

* cited by examiner

FULL CONTACT BRAKE

FIELD

The present teachings generally relate to a brake system including a rotor and brake pads, where the brake pads, during a brake apply, contact a full circumference of the rotor to generate a braking force.

BACKGROUND

The present teachings are predicated upon providing an improved brake system for use with vehicles. For example, the brake system may be used with almost any vehicle (e.g. car, truck, bus, train, airplane, or the like). Alternatively, the brake system may be integrated into assemblies used for manufacturing or other equipment that require a brake such as a lathe, winder for paper products or cloth, amusement park rides, wind turbines, the like, or a combination thereof. However, the present teachings are most suitable for use with a passenger vehicle (i.e. a car, truck, sports utility vehicle, or the like). Typical, brake systems used have a floating caliper, a fixed caliper, or are a drum brake system as is discussed below.

A typical drum brake system includes an enclosed drum with friction plates located inside. During running there is a gap between an internal circumference of the drum and an outer surface of the brake pads or shoes. During a brake apply the brake pads or shoes are moved radially outward into contact with the drum so that a braking force is created. Some examples of drum brakes may be found in U.S. Pat. Nos. 2,129,199; 5,025,898; and 7,325,659.

Generally, a floating caliper braking system includes a rotor, a caliper body, a support bracket, and an inboard brake pad and an outboard brake pad located on opposing sides of the rotor. The caliper body further includes a bridge, one or more fingers, and a piston bore. The piston bore houses a piston. The piston bore has a bore axis that the piston moves along during a brake apply and a brake release. The piston bore may include a fluid inlet, a closed wall, a front opening, and a cylindrical side wall that has a seal groove located near the front opening. Typically, the fluid inlet is located in the closed wall of the piston bore so that when pressure is applied the fluid will flow into the piston bore and push the piston towards the front opening and into contact with a brake pad and then the brake pad into contact with a rotor. The caliper housing, upon the brake pad contacting the rotor, moves so that the one or more fingers contact the opposing brake pad and then move the opposing brake pad into contact with the opposing side of the rotor so that a braking force is created. Some examples of floating style disc brakes may be found in U.S. patent application Ser. Nos. 3,260,332; 3,997,034; 4,342,380; 4,681,194; 4,716,994; and 7,357,228 all of which are incorporated by reference herein for ail purposes.

Generally, a fixed caliper braking system includes a rotor, a caliper body, a support bracket, and an inboard brake pad and an outboard brake pad located on opposing sides of the rotor. The caliper body includes a bridge, an inboard piston bore having an inboard piston, and an outboard piston bore having an outboard piston. The outboard piston and the inboard piston are located on opposite sides of the rotor so that during a brake apply both pistons move each respective brake pad into contact with the respective sides of the rotor. During a brake apply, the caliper remains generally static as the inboard piston and the outboard piston travel toward each other moving the respective brake pad into contact with opposing sides of the rotor so that a braking force is created.

Some examples of fixed disc brake systems may be found in U.S. Pat. Nos. 5,099,961 and 6,367,595 all of which are incorporated by reference herein for all purposes.

Examples of additional brake systems are found in U.S. Pat. Nos. 3,802,539 and 6,318,513; U.S. Patent Application Publication Nos. 2006/0260886; 2008/0261773; and 2010/0258387; and International Patent Application Publication No. WO98/29671; WO2005/038282; WO2005/038285; WO2005/038287; and WO2006/047886. However, some of these systems include multiple parts to function, are complex and difficult to assemble and repair; or both, thus, may create challenges in assembly and serviceability.

It would be attractive to have a brake system that has lower fewer parts so that complexity of the brake system is reduced and assembly and serviceability are simplified. It would be attractive to have a device with a reduced number of parts that provides improved braking performance. What is needed is a device that reduces the mass and/or number of parts while maintaining a low taper wear for the brake pads, low disc thickness variation (DTV) of the rotor and low brake torque variation (BTV) of the brake pads so that the full contact brake provides improved NVH performance and the operator and/or passengers do not experience any adverse effects on the system. The teachings herein provide a brake system that includes a pair of opposing brake pads and a rotor that have substantially equal surface areas so that during a brake apply the entire inboard and outboard circular rings, or plates, of the rotor and brake pads are contacted simultaneously. What is needed is a brake system that is configured so that during a brake apply the pistons, brake pads, or preferably both are free of rotation with the rotor without the use of mechanical locking devices.

SUMMARY

The present teachings meet one or more of the present needs by providing: a full contact brake comprising: (a) an inboard housing including: (i) an inner seal groove, the inner seal groove including a seal, and (ii) an outer seal groove, the outer seal groove including a seal; (b) an outboard housing including: (i) an inner seal groove, the inner seal groove including a seal, and (ii) an outer seal groove, the outer seal groove including a seal; and (c) an annular bridge tube located between and connecting the inboard housing to the outboard housing; wherein the inboard housing, the outboard housing, and the annular bridge tube form a housing that comprises: (i) an inboard piston located between the seal in the inner seal groove and the seal in the outer seal groove in the inboard housing; (ii) an outboard piston located between the seal in the inner seal groove and the seal in the outer seal groove in the outboard housing; and a rotor located between the inboard piston and the outboard piston so that during a brake apply both the inboard piston is moved towards an inboard side of the rotor and the outboard piston is moved towards an outboard side of the rotor; and wherein the seal in the inner seal groove and the seal in the outer seal groove of the inboard housing form an interference fit around the inboard piston and the seal in the inner seal groove and the seal in the outer seal groove of the outboard housing form an interfere fit around the outboard piston so that rotation of the inboard piston and the outboard piston respectively are substantially prevented during a brake apply.

The present teachings provide: A full contact brake comprising: (a) an inboard housing including: (i) an inner seal groove, the inner seal groove including a seal, and (ii) an outer seal groove, the outer seal groove including a seal; (b) an outboard housing including: (i) an inner seal groove, the inner seal groove including a seal, and (ii) an outer seal groove, the outer seal groove including a seal; and (c) an annular bridge tube located between and connecting the inboard housing to the outboard housing, the annular bridge tube including a plurality of windows around a circumference of the annular bridge tube; wherein the inboard housing, the outboard housing, and the annular bridge tube forms a housing that consists essentially of: (i) an inboard piston located between the seal in the inner seal groove and the seal in the outer seal groove in the inboard housing; (ii) an outboard piston located between the seal in the inner seal groove and the seal in the outer seal groove in the outboard housing; (iii) a rotor located between the inboard piston and the outboard piston; (iv) an inboard brake pad located between the inboard piston and the rotor; and (v) an outboard brake pad located between the outboard piston and the rotor; wherein, during a brake apply, the inboard piston moves the inboard brake pad into contact with an inboard side of the rotor and the outboard piston moves the outboard brake pad into contact with an outboard side of the rotor; and wherein the seal in the inner seal groove and the seal in the outer seal groove of the inboard housing form an interference fit around the inboard piston and the seal in the inner seal groove and the seal in the outer seal groove of the outboard housing form an interfere fit around the outboard piston so that rotation of the inboard piston and the outboard piston respectively are substantially prevented during a brake apply.

The teachings herein surprisingly solve one or more of these problems by providing a brake system that has lower fewer parts so that complexity of the brake system is reduced and assembly and serviceability are simplified. The teachings herein provide a device with a reduced number of parts that provides improved braking performance. The teachings herein provide a device that reduces the mass and/or number of parts while maintaining a low taper wear for the brake pads, low disc thickness variation (DTV) of the rotor and low brake torque variation (BTV) of the brake pads so that the full contact brake provides improved NVH performance and the operator and/or passengers do not experience any adverse effects on the system. The teachings herein provide a brake system that includes a pair of opposing brake pads and a rotor that have substantially equal surface areas so that during a brake apply the entire inboard and outboard circular rings, or plates, of the rotor and brake pads are contacted simultaneously. The teachings herein provide a brake system that is configured so that during a brake apply the pistons, brake pads, or preferably both are free of rotation with the rotor without the use of mechanical locking devices.

DETAILED DESCRIPTION

Figure 1:
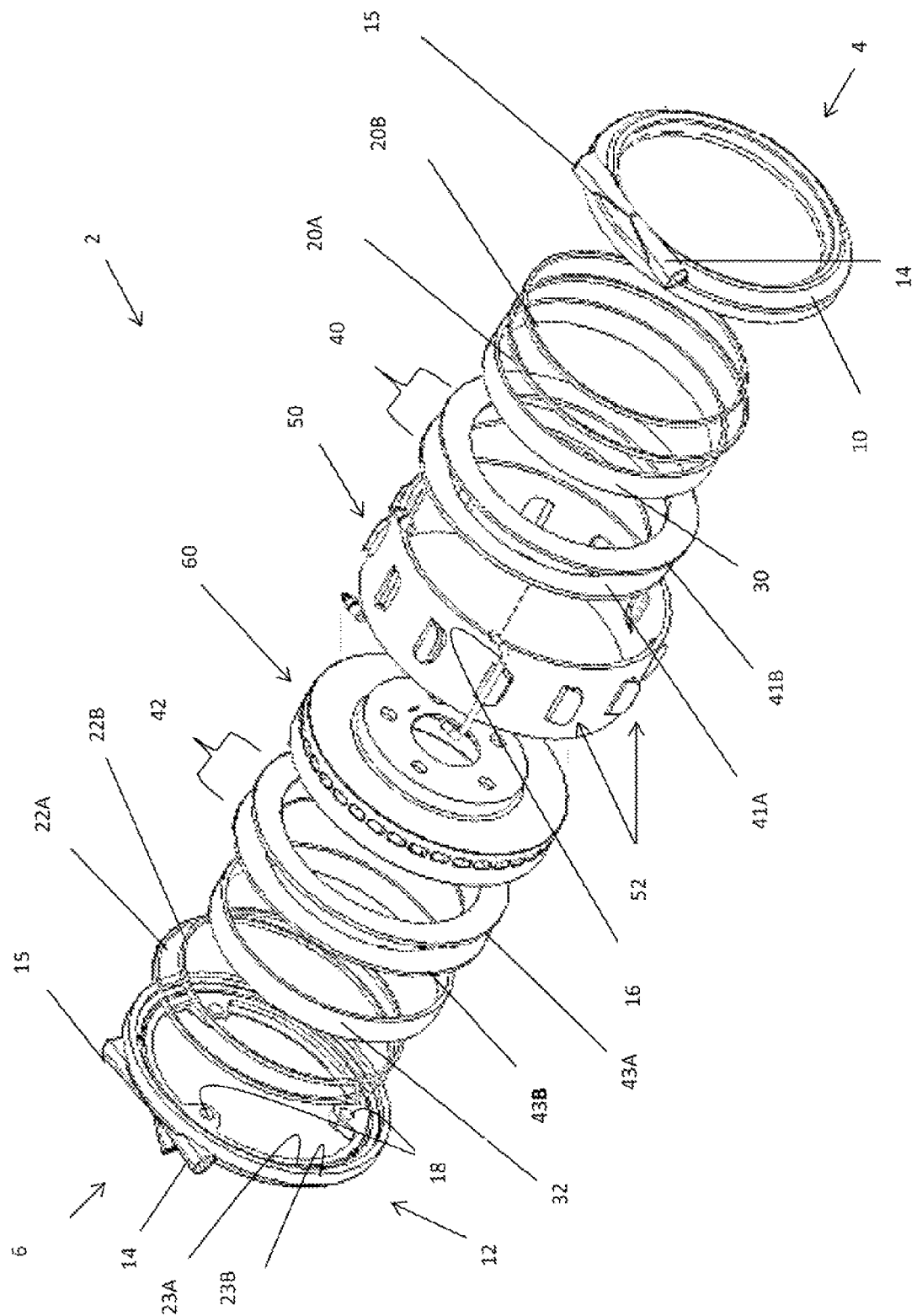
FIG. 1 illustrates an exploded view of a full contact brake.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a brake system. The brake system may include one or more fluid pumps, one or more brake components, one or more combinations of brake components, or a combination thereof. Preferably, the brake system is free of a caliper. The brake system may have components that are connected to a knuckle of a vehicle, components that are located remote from the knuckle, or both. Preferably, the full contact brake is configured to connect to a knuckle of a vehicle. The present teachings provide a full contact brake where an entire circumference of two or more opposing pad assemblies are in contact during a brake apply. The full contact brake preferably includes a rotor located between two opposing pad assemblies and during a brake apply the two opposing pad assemblies contact a full circumference of the rotor to produce a braking force. Preferably, the rotor is an annular rotor and the two opposing pad assemblies are annular such that during a brake apply the rotor is sandwiched between the opposing pad assemblies to form a bake apply. The full contact brake includes a housing that contains the internal braking componentry (e.g., seals, pistons, pad assemblies, rotor, or a combination thereof).

The housing may be one or more components that are connected together to form an external structure that houses one or more internal braking components. The housing may be a structure that protects the internal braking components, prevents contamination of the internal braking components, maintains the internal braking components in an interconnected relationship, or a combination thereof. The housing may retain fluid, hydraulic fluid, assist in forming a brake apply, assist in moving one or more pistons, or a combination thereof. The housing may be connected together may any device that allows the housing to be disassembled so that the internal components may be serviced and/or replaced. The housing may be connected by fasteners, a friction fit, one or more locking features, interconnected elements, or a combination thereof. Preferably, the housing is connected by a plurality of bolts extending around a circumference of the housing. The housing includes an inboard side (i.e., a side that faces towards and/or under a component such as a vehicle) and an outboard side (i.e., a side that faces away from a component such as a vehicle). The housing may be a combination of one or more components. Preferably, the housing is comprised of at least an outboard housing, an inboard housing, and a bridge tube.

The bridge tube may be any device that connects the inboard housing and the outboard housing together. The bridge tube may extend between an inboard housing and the outboard housing and be located proximate to the inboard housing and the outboard housing and is mechanically connected to both the inboard housing and the outboard housing. The bridge tube may be any device that mechanically connects the inboard housing and the outboard housing and has sufficient strength so that during a brake apply the bridge tube maintains the inboard housing and the outboard housing relative to each other, resists the opposing forces of the pistons against a rotor, protects the rotor and brake pads from debris, or a combination thereof. For example, during a brake apply hydraulic pressure may be generated that moves the opposing pistons and pad assemblies into contact with the rotor and this contact with the rotor may generate a force on each side (e.g. 1000N or more) away from the rotor, and the bridge tube may be sufficiently rigid and suitably connected so that the bridge tube prevents the inboard housing and the outboard housing from moving away from each other (e.g., 2000N or more). The bridge tube may form a friction fit around the inboard housing and the outboard housing. The bridge tube may indirectly connect the inboard housing and the outboard housing. The bridge tube may extend over and/or under one or more fasteners that extend from the inboard housing to the outboard housing. The bridge tube may be free of any mechanical fasteners connecting the bridge tube to the inboard housing, the outboard housing, or both. The bridge tube may be retained between the inboard housing and the outboard housing by one or more structures of the housing. For example, the inboard housing and the outboard housing may include one or more hydraulic features, one or more venting features, or both around a circumference of the respective housing and the hydraulic feature, the venting features or both may extend above the bridge tube so that the bridge tube cannot slide over the inboard housing, the outboard housing, or both. The bridge tube may fit into a channel and/or recess in the inboard housing, the outboard housing, or both so that the channel and/or recess retains the bridge tube in the full contact brake. The bridge tube may extend over the inboard housing, the outboard housing, or both and be free of any fixed connections to the inboard housing, the outboard housing, or both. Preferably, the bridge tube is connected to the inboard housing, the outboard housing, or both via one or more fasteners and preferably a plurality of fasteners (e.g., screws, bolts, rivets, pins, the like, or a combination thereof). For example, the bridge tube may extend between the inboard housing and the outboard housing and a plurality of bolts may extend through the bridge tube and into the inboard housing on one side and through the bridge tube and into the outboard housing on an opposing side so that the inboard housing and outboard housing are mechanically connected to each other. The bridge tube may be of any size and shape so that the bridge tube extends between the inboard housing and the outboard housing. The bridge tube may be circular, oval, include a through hole, be a polygon, or a combination thereof. The bridge tube may be an annular piece of formed material. The bridge may be a sheet of metal that is formed into an annular shape, a tube, or both so that the bridge tube covers the internal components of the full contact brake, so that the bridge tube connects the inboard housing and the outboard housing together, or both. The bridge tube may be formed metal with ends that are connected together (e.g., welded, crimped, mechanically fastened, bolted) so that a tube is formed. The bridge tube may be a plurality of discrete metal pieces that extend between the inboard housing and the outboard housing. For example, the bridge tube may be two or more bars that are connected to both the inboard housing and the outboard housing. The bridge tube may include one or more windows, one or more through holes, one or more openings, or a combination thereof that extend through all or a portion of the bridge tube.

The one or more windows may be any device and/or feature that extends fully and/or partially through the bridge tube. The one or more windows may be a gap between two or more discrete bars that form the bridge tube. The windows may be a space between discrete bars so that components of the full contact brake are visible. The windows may include at least a portion that is a through hole that extends through the bridge tube. The windows may be a hole that is formed in the bridge tube by displacing a portion of the bridge tube. For example, a shape may be cut in the bridge tube and then bent so that a through hole is formed but the through hole may be partially covered by the bent material. The bent material may face any direction so that spent friction material, removed friction material, friction dust, or a combination thereof may exit or be trapped inside the full contact brake. The bent material may face any direction so that air may enter the housing and cool the internal components (e.g., rotor, brake pads, piston, hydraulic fluid, the like, or a combination thereof). The bent material may face inboard, outboard, direction of movement (e.g., the direction of movement of a vehicle including the full contact brake), away from a direction of movement (e.g., in an opposite direction of movement of a vehicle including the full contact brake), obliquely (e.g., at a slanted angle extending from one edge to an opposing edge), or a combination thereof. The bent material may act as an air scoop directing a flow of air into the through hole and past the rotor, brake pads, pistons, or a combination thereof. The bent material may block air from flowing into the through holes. The windows may be free of bent material. The windows, the bent material, or both may be located in any configuration around a circumference of the bridge tube. The windows, the bent material, or both may be randomly located, evenly spaced, matched pairs, a double wide configuration, intermittently located, symmetrically located, asymmetrically located, staggered, linear, or a combination thereof. Preferably, the windows, the bent material, or both are evenly spaced from the inboard housing and the outboard housing.

The outboard housing and the inboard housing may be any component that forms an end of the housing and the full contact brake. The outboard housing and the inboard housing may be substantially mirror images of each other. The inboard housing and the outboard housing may form opposing structures that have an inside and an outside and the inside of the inboard housing may face the inside of the outboard housing. The inboard housing, the outboard housing, or both may be directly connected, indirectly connected, or both. The inboard housing, the outboard housing, or both may have a piece that directly contacts to the opposing housing so that a connection is formed. The inboard housing, the outboard housing, or both may be connected via one or more fasteners that extend between the inboard housing and the outboard housing. The inboard housing, the outboard housing, or both may be generally annular, generally circular, generally toroid, donut shaped, or a combination thereof. The inboard housing, the outboard housing, or both may have an open center, a closed center, a partially closed center with spokes extending to an outer annular ring, or a combination thereof. Both the inboard housing and the outboard housing may be open, closed, partially open, or a combination thereof. One of the inboard housing or the outboard housing may be open and one of the inboard housing or the outboard housing may be closed. The inboard housing, the outboard housing, or both may include one or more connection features.

The one or more connection features may be any feature that assists in connecting the full contact brake to a support structure such as a knuckle of a vehicle. The one or more connection features may be any feature that assists in connecting the full contact brake to a knuckle of a vehicle. Preferably, the full contact brake includes at least three connection features so that the full contact brake may be bolted to a knuckle of a vehicle. The one or more connection features may be located on a back side of the housing opposite the annular groove. The full contact brake may include 3 or more, 4 or more, 5 or more, or 6 or more connection features. The one or more connection features may connect one side of the housing so that the housing is static and a fastener extending between the side and an opposing side may maintain the inboard housing and the outboard housing so that fluid is maintained within the full contact brake.

The connection features may assist in sealing the housing so that one or more sealed fluid grooves are formed in the housing for generating pressure during a brake apply. Preferably, at least a portion of the inboard housing and the outboard housing is sealed and/or forms an annular groove (e.g., a piston bore) that includes a fluid. The inboard housing may include an inboard piston bore and the outboard housing may include an outboard piston bore. The inboard piston bore, outboard piston bore or both may be an annular groove that houses all or a portion of the piston so that the piston bores assist in creating a brake apply. The inboard piston bore, outboard piston bore, or both may be configured so that the piston bore includes fluid and houses a piston so that the fluid may create fluid pressure to move the piston during a brake apply.

The fluid may be a hydraulic fluid and preferably brake fluid. The fluid may be any fluid that may be used to create a brake apply, move a piston, or both. The fluid may be any fluid that may be retained by the one or more seals in the seal grooves of the inboard housing, the outboard housing, or both.

The inboard housing, the outboard housing, or both may include one or more seal grooves and preferably two seal grooves within the piston bores for housing seals that retain a fluid within the respective piston bores. The seal grooves may be of any size and shape so that the seal grooves substantially prevent fluid leakage and/or entirely eliminate fluid leakage. The seal grooves may be of any size and shape so that when seals are installed within the seal grooves, the seals assist is retaining one or more pistons within the inboard housing or the outboard housing respectively. The seal grooves are preferably annular grooves within the inboard housing and the outboard housing. Preferably, the inboard housing and the outboard housing each include two seal grooves. The seal grooves may be concentric circles that extend around a circumference of the inboard housing and the outboard housing. Preferably, when two seal grooves are present an opening in the seal grooves face each other so that the seals extend towards each other and sandwich a piston therebetween. The outboard housing, the inboard housing, or both may include an inner seal groove and an outer seal groove where the outer seal groove has a larger circumference than the inner seal groove. The seal grooves may have any depth so that when a seal is installed a portion of the seal extends out of the seal groove and is above of the inner bore, the outer bore, or both. The seal groove may have a depth and width so that when a piston is installed the piston compresses a height of a seal in the groove so that the width of the seal is expanded to fill the seal groove. The seal grooves may be configured so that when seals are installed in the seal grooves and a piston is installed in the piston bore between the seals so that an interference fit is formed and rotation of the piston is substantially prevented during running, during a brake apply, or a condition therebetween.

The seals may be of any size and shape so that the seals fit within the respective seal groove and prevent fluid from passing. The seals may be of any size and shape so that the seals assist in axially moving the piston during a brake apply, during a brake retract, during a brake release, or a combination thereof. Preferably, the seals are of sufficient strength and/or size so that each of the seals form an interference fit on a surface of the piston and prevent rotational movement of the piston (e.g., movement of the piston with the rotor) during a brake apply, a brake off, or both. For example, an inner seal forms an interference fit on an inner surface of the piston and the outer seal forms an interference fit on an outer surface of the piston. The seals, the pistons, or both may be of sufficient strength and durability to withstand the torque, pressure, or both applied during braking so that the piston, seals, brake pads, or a combination thereof remain substantially static, are substantially free of rotation, or both; an interference fit is created; a force of an interference fit is increased; or a combination thereof. The seals may be of any size and shape so that the seals substantially prevent rotation of the piston, the brake pads, or both when the brake pads are in contact with a rotor during a deceleration event, during braking, or both. The seals may have a height so that the seals form a friction fit around a respective circumference of a piston, so that the seals fit within the seal grooves, so that at least a portion of the seal extends out of the seal groove, or a combination thereof. Preferably, each seal is generally annular so that one seal fits in one seal groove and does not: extend beyond the seal groove, between seal grooves, from one seal groove to another seal groove, or a combination thereof. More preferably, the seals may not be "M-shaped," 'W-shaped,' or both. The seals may not extend around an end of the piston. Preferably, each of the one or more seals only abuts a single surface and/or wall of a piston (e.g., the seals only contact an inner diameter surface or an outer diameter surface). More preferably, the one or more seals do not extend around an end of a piston. The seals may extend out of the seal grooves so that a distance between the seals is smaller than the width of the piston when the piston is uninstalled. The seals may be made of any material that may prevent passage of a fluid. The seals may be made of any material that is resistant to degradation in brake fluid. The seals may be made of any material that has at least some elasticity. The seals may include a polymer, a rubber, a natural material, a synthetic material, or mixtures thereof. The seals may be made of a material that may form a friction fit and prevent rotation of the pistons during a brake apply.

The one or more pistons may be any part of the full contact brake that is moved during a brake apply. The one or more pistons may be any part of the full contact brake that is moved by a hydraulic force so that the pistons move a brake pad into contact with a rotor. The pistons may be an annular ring that fits at least partially within a groove in the inboard housing, the outboard housing, or both. The one or more pistons may be free of closed ends. The piston may be tubular, have two open ends, or both. The one or more pistons may be any device that is sandwiched between two opposing seals and the one or more pistons are advanced during a brake apply so that the one or more pistons contact one or more brake pads, move one or more brake pads in a braking direction, or both. The cylindrical surfaces of the piston may be substantially normal to the seals, the seal grooves, or both. The seals, seal grooves, or both may be located at an angle relative to the piston. The one or more pistons may extend at least partially into a groove between two opposing seals so that the one or more pistons, a fluid (e.g., brake fluid), or both are retained within the inboard housing, the outboard housing, or both. The one or more pistons may extend in a direction that is substantially parallel to the axis of rotation. The one or more pistons may be of sufficient size so that the pistons have sufficient area to be moved by fluid pressure and create a braking force, to move one or more brake pads, or both. Preferably, the one or more piston axes are substantially normal to one or more brake pads in the full contact brake. The one or more pistons may have a sufficient circumference so that the cylindrical thickness (e.g., width) of the piston may be thin so that the thickness of the inboard housing, the outboard housing, or both may be thin. The one or more pistons may be about 1 mm or more, 2 mm or more, or about 3 mm or more in thickness. The one or more pistons may be about 3 cm or less, about 1.5 cm or less, or about 1 cm or less in thickness. The one or more pistons may be tapered, planar, have a constant thickness, a varied thickness, or a combination thereof. The piston may have an end portion that abuts a pad assembly. The end portion of the piston may be generally flat, generally smooth, or both. The piston may have a sufficient strength so that the piston withstands an interference fit between two opposing seals, withstands torque on the pistons from the seals and brake pads during a brake apply, or both.

The interference fit (i.e., piston to seal interface) may have sufficient strength that the piston is substantially prevented from rotating during a brake apply (e.g., rotates about 180 degrees or less, preferably about 90 degrees or less, more preferably about 45 degrees or less rotation of the piston, most preferably about 15 degrees or less), the brake pads are substantially prevented from rotating during a brake apply (e.g., about 180 degrees or less, preferably about 90 degrees or less, more preferably about 45 degrees or less, or most preferably about 15 degrees or less rotation of the piston), a friction force is created, or a combination thereof. The interference fit may substantially prevent rotation of the piston when a torque of about 1000 N*m or more, about 2000 N*m or more, about 3000 N*m or more, preferably about 4000 N*m or more, more preferably about 4500 N*m or more, or most preferably about 5000 N*m or more (e.g., about 5500 N*m) is applied to the piston, the seals, the brake pads, or a combination thereof during a brake apply. The force of the interference fit may increase as pressure from the brake fluid increases. For example, as a user increases the fluid force on the piston and seals during a brake apply and the force of the interference fit is increased on the surfaces of the piston. The force of the fluid on the seals may be directly proportional to the strength of the interference fit (e.g., resistance to torque). The force of each seal on the piston may be directly proportional to the resistance to torque. The force of each seal on the piston may be about 25,000 N or more about 50,000 N or more, preferably about 75,000 N or more, more preferably about 90,000 N or more, or even more preferably about 100,000 N or more. The force may prevent rotation of the brake pads by a connecting feature, friction, an adhesive, or a combination thereof. The end portion of the piston may include one or mating features so that the piston and a pad assembly may be interconnected.

The mating feature may form an interconnection so that the piston and pad assembly move with each other during a brake apply, running, a brake retract, or a combination thereof. The mating feature may only form an interconnection that prevents rotation of the pad assembly during a deceleration event. The one or more mating features may be any feature that forms a connection with one or more pad assemblies. The one or more mating features may form a permanent connection, a removable connection, a temporary connection, or a combination thereof. The one or more mating features may form a connection during each brake apply so that the piston prevents rotational movement of the pad assembly. The one or more mating features may be a plurality of: teeth, serrations, a sinusoidal feature, a detent, projections, recesses, or a combination thereof. The mating features of the piston may be an alternating feature with those of a mating feature of the pad assembly so that the pad assembly is prevented from moving. The mating features of the piston may be a separate part of the piston, an integral part of the piston, or both. The mating features may be made of a different material as the piston, the same material as the piston, or both.

The one or more one or more pistons may be made of any material that is resistant to the fluid used in the full contact brake. The one or more pistons may be made of a phenolic material, stainless steel, an iron based material, an aluminum based material, or a combination thereof. The one or more pistons may be ring shaped, cylindrical shaped, toroidally shaped, donut shaped, or a combination thereof. During a brake apply, a fluid may enter the inboard housing, the outboard housing, or both through one or more hydraulic connection tubing that is attached to hydraulic features of the inboard housing, the outboard housing, or both and fill a cavity within the inboard housing, the outboard housing, or both until the hydraulic fluid provides sufficient pressure and displaces the piston axially towards the rotor.

The one or more hydraulic features may be any feature in the inboard housing, the outboard housing, or both that is configured so that a fluid may be introduced into the respective housing during a brake apply and exit the respective housing after a brake apply (e.g., during a brake retract, running, or both). The hydraulic features may be a port that allows fluid ingress and egress into and/or between the inboard housing and the outboard housing. The hydraulic features may extend out from the inboard housing, the outboard housing, or both so that fluid may be introduced into a channel located such that the piston is moved during a brake apply by hydraulic pressure from the fluid. The hydraulic features may be raised above a circumference of the full contact brake so that connection tubing may extend between the inboard housing and the outboard housing. The hydraulic features may be an integral part of the inboard housing, the outboard housing, or both. The hydraulic features may be connected at one point to the inboard housing, the outboard housing, or both but movable so that the full contact brake may fit into a packing space. The inboard housing, the outboard housing, or both may include more than one hydraulic features. The hydraulic features may be directed in opposing directions. For example, one hydraulic feature may be pointed in a first direction and the second hydraulic feature pointed in a second direction so that a complete circle is formed such that fluid enters the first hydraulic feature goes around the first housing and exits the second hydraulic feature through the connection tubing then enters in a third hydraulic feature around a second housing and out through a fourth hydraulic feature. Each housing may include a hydraulic feature and an opposing venting feature.

The venting features may be any feature that allows a fluid to exit a housing (e.g., inboard housing, outboard housing, or both). The venting features may allow air to exit, a fluid to exit, hydraulic fluid, brake fluid, or a combination thereof to exit the full contact brake. The venting feature may be open to the environment, connected to connection tubing, connected to a hydraulic pump, or a combination thereof.

The connection tubing may be any device that transports a fluid throughout the brake system. The connection tubing may connect the inboard housing, the outboard housing, or both to a pump. The connection tubing may fluidly connect the inboard housing to the outboard housing. The connection tubing may be flexible, rigid, fixed, rotatable, or a combination thereof. The connection tubing may include metal, a polymeric material, braded materials, elastomers, or a combination thereof. The connection tithing may be straight, arcuate, include straight portions and include arcuate portions, or a combination thereof. The connection tubing may be any device and configuration so that during a brake apply the connection tubing assists in providing fluid to the full contact brake so that the one or more pad assemblies in the full contact brake are moved towards a rotor to form a braking force.

The pad assembly may be any device that produces a friction force during a brake apply so that a deceleration event occurs. The pad assembly may include one or more components that assist in forming friction during a brake apply. The pad assembly may include a pressure plate and friction material. The pressure plate may be any component that supports the friction material so that when a piston contacts the pressure plate the friction material is moved into contact with the rotor and the friction material is not damaged by the pressure from the piston. The pressure plate may include one or more mating features. The mating features of the pressure plate may be complementary to the mating features of the piston so that when connected the piston substantially prevents rotation of the pad assembly. The one or more mating features may be one or more recesses that receive one or more projections such as teeth of the piston or vice versa. Preferably, the one or more mating features are a plurality of projections such as teeth, a plurality of recesses, or a combination of both. All of the features discussed herein for the mating feature of the piston may be part of the pressure plate and those features are expressly incorporated by reference herein. The brake system may be free of one or more pad clips to incorporate the pad assembly into the full contact brake. The pad assembly may be free of a pad clip that forms a connection between the pad assembly and the brake assembly, the piston and a pad assembly, the pad assembly and a housing, or a combination thereof. The pad assembly, full contact brake, or both may be free of pad abutments that support the braking forces. The outboard housing, inboard housing, or both may be free of a pad abutment that forms a connection surface for connecting the pad assemblies in the full contact brake. The friction material may be any material that contacts the rotor and produces a friction force when the friction material is in contact with the rotor. The friction material may be a material that is harder than the rotor, softer than the rotor, a similar hardness as the rotor, or a combination thereof.

The rotor may be any part of the brake system that rotates during use and has a friction surface that is contacted by the pad friction material during a deceleration event such as braking. The rotor may be any rotor that is bolted on a corner module of an automobile vehicle. The rotor may be fixed so that the rotor is prevented from moving along its rotational axis. The rotor may be a vented rotor. Preferably, the rotor includes two or more friction surfaces so that a brake pad may contact each side of the rotor to create friction forces during a deceleration event. The rotor may include an inboard side for being contacted by an inboard brake pad and an outboard side for being contacted by an outboard brake pad. The rotor may rotate around an axis.

The full contact brake includes an axis. The full contact brake may include one or more axes. One of the one or more axes may be an axis of rotation of one or more components of the full contact brake. The full contact brake may include a single axis for all of the components of the brake system (e.g., the outboard housing, the inboard housing, the pad assemblies, the rotor, the bridge tube, the seals, the seal grooves, the piston, or a combination thereof). The full contact brake may include a series of concentric circles and the one or more axes may be a single axis that extends through the center of the series of concentric circles.

FIG. 1 illustrates an exploded view a full contact brake 2 having an outboard side 4 and an inboard side 6. The full contact brake 2 includes an outboard housing 10 on the outboard side 4 and an inboard housing 12 on the inboard side 6 and a bridge tube 50 connecting the outboard housing 10 to the inboard housing 12 so that a housing is formed that contains the other internal components The outboard housing 10 and the inboard housing 12 both include hydraulic features 14 and venting features 15 for communicating hydraulic fluid between the outboard housing 10 and inboard housing 12 through connection tubing 16 The inboard housing 12 includes three connection features 18 for connecting the full contact brake 2 to a knuckle (not shown). The outboard housing 10 includes an outer seal groove (not shown) and an inner seal groove (not shown) that house with an outboard seal 20B around an outer diameter of an outboard annular piston 30 and an inboard seal 20B on the inner diameter of the outboard annular piston 30. An outboard pad assembly 40, including friction material 41A and a pressure plate 418, is located inboard of the outboard annular piston 30 so that upon movement of the outboard annular piston 30 the friction material 41A of the outboard pad assembly 40 is moved into contact with an outboard side of a rotor 60. The inboard housing 12 includes an outer seal groove 23B with an inboard seal 22B and an inner seal groove 23A with an inboard seal 22A, the inboard seal 22B extends around an outer diameter of an inboard annular piston 32 and an inboard seal 22A extends around an inner diameter of the inboard annular piston 32. An inboard pad assembly 42, including friction material 43A and a pressure plate 43B, is located outboard of the inboard annular piston 32 so that upon movement of the inboard annular piston 32 into contact with the pressure plate 41B of the inboard pad assembly 42, the friction material 41A of the inboard pad assembly 42 is moved into contact with an inboard side of a rotor 60. The bridge tube 50, having windows 52, extends over the internal components of the full contact brake 2 and between the outboard housing 10 and the inboard housing 12 so that a housing is formed.

Figure 2:
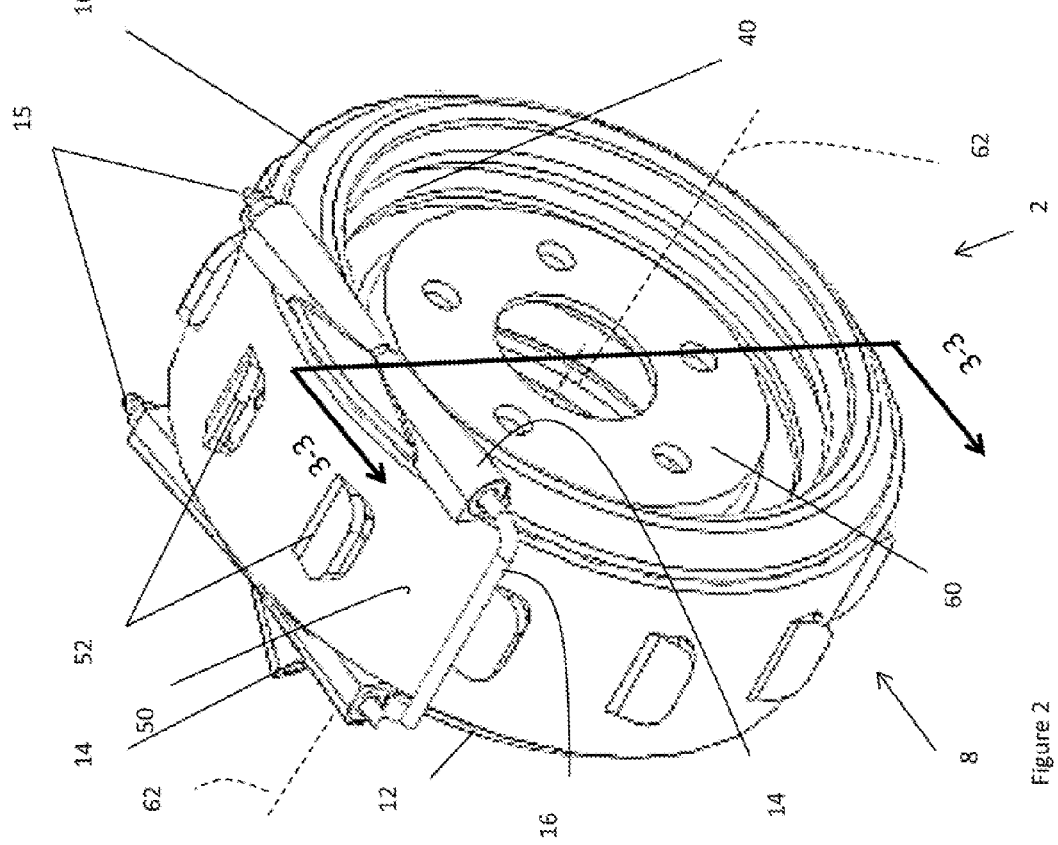
FIG. 2 illustrates a full contact brake.

FIG. 2 illustrates a perspective view of one example of a full contact brake 2. The full contact brake 2 includes an outboard housing 10 and an inboard housing 12 connected by a bridge tube 50 so that a housing 8 is formed. The bridge tube 50 includes a plurality of windows 52 for ventilation. The outboard housing 10 and the inboard housing 12 are also connected by connection tubing 16 that supplies hydraulic fluid (not shown) that extend from hydraulic features 14 and venting features 15 in the outboard housing 10 and inboard housing 12. As illustrated the outboard pad assembly 40 is visible and is located proximate to an outboard side of the rotor 60. An axis 62 extends through the rotor 60 and housing 8. The axis 62 is a rotational axis of the rotor 60 during running.

Figure 3:
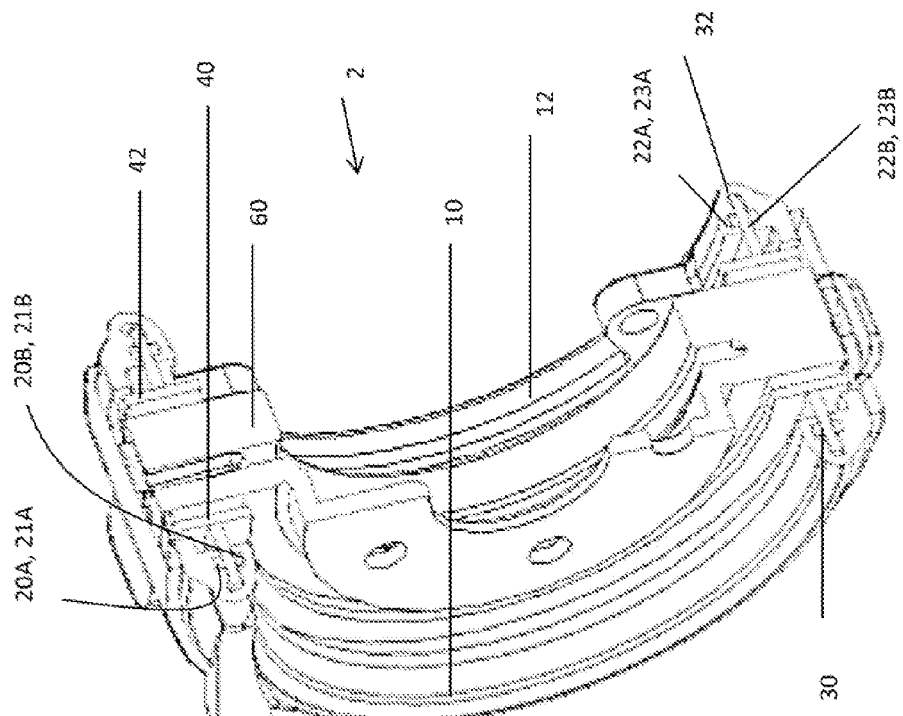
FIG. 3 illustrates a cross sectional view of the full contact brake of FIG. 2 cut along line 3-3.

FIG. 3 is a cross-section of the full contact brake 2 along line 3-3 of FIG. 2. The outboard housing 10 has an inner seal groove 21A that houses a seal 20A and an outer seal groove 21B that houses a seal 20B and an outboard annular piston 30 is located therebetween so that hydraulic fluid is retained within the outboard housing 10. The outboard annular piston 30 during a brake apply moves into contact with an outboard pad assembly 40 and then moves the outboard pad assembly 40 into contact with an outboard side of the rotor 60. The outboard housing 12 has an inner seal groove 23A that houses a seal 22A and an outer seal groove 23B that houses a seal 22B and an inboard annular piston 32 is located therebetween so that hydraulic fluid is retained within the inboard housing 12. The inboard annular piston 32 during a brake apply moves into contact with an inboard pad assembly 42 and then moves the inboard pad assembly 42 into contact with an inboard side of the rotor 60.

Figure 4:
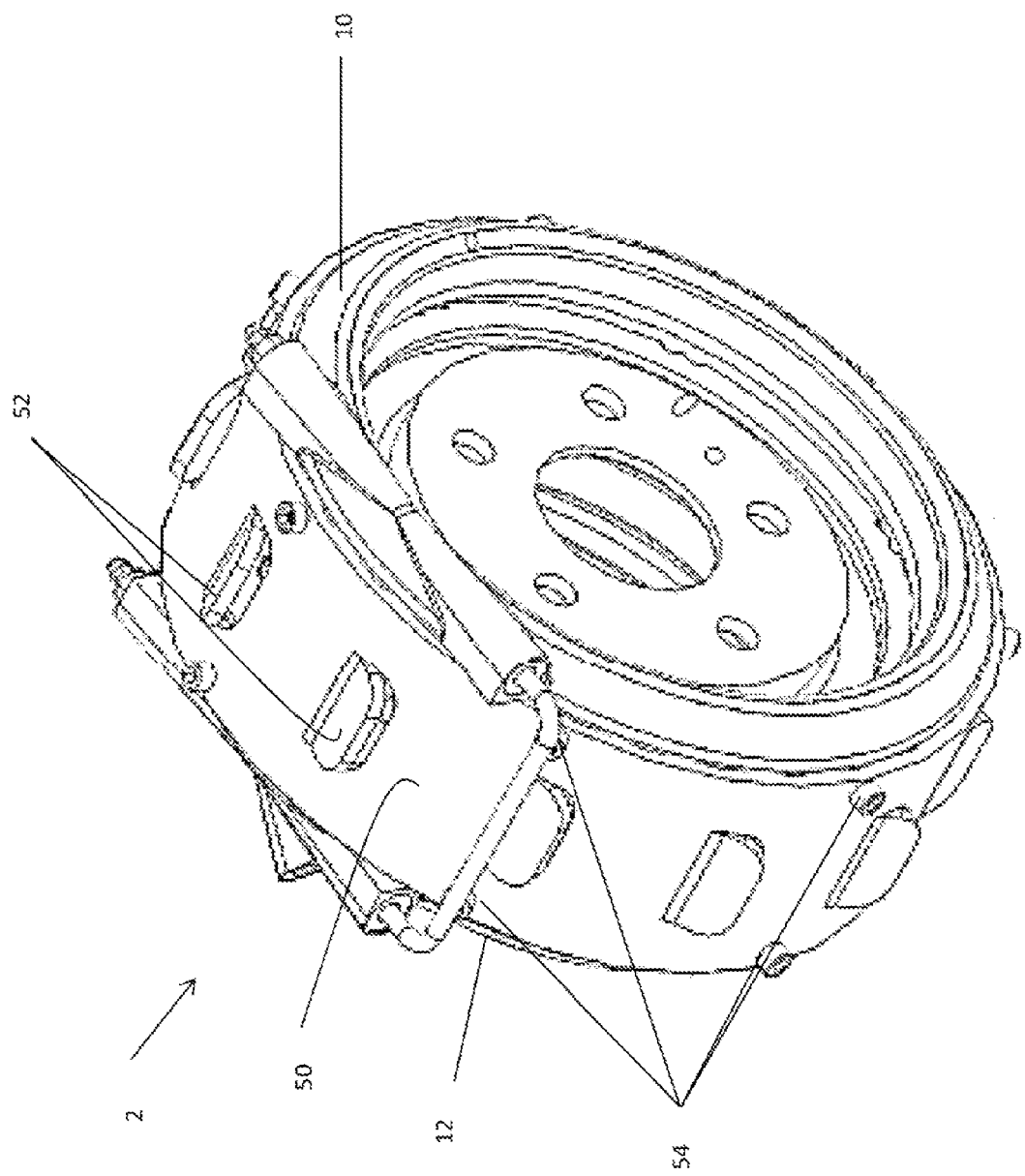
FIG. 4 illustrates another example of a full contact brake.

FIG. 4 illustrates an example of a full contact brake 2 that includes an outboard housing 10 and an inboard housing 12 that are connected together by a bridge tube 50. The bridge tube 50 includes a plurality of windows 52 and a plurality of connection ports 56 (not shown) that extend through the bridge tube 50 so that fasteners 54 connect the bridge tube 50 to the outboard housing 10 and the inboard housing 12 respectively.

Figure 5:
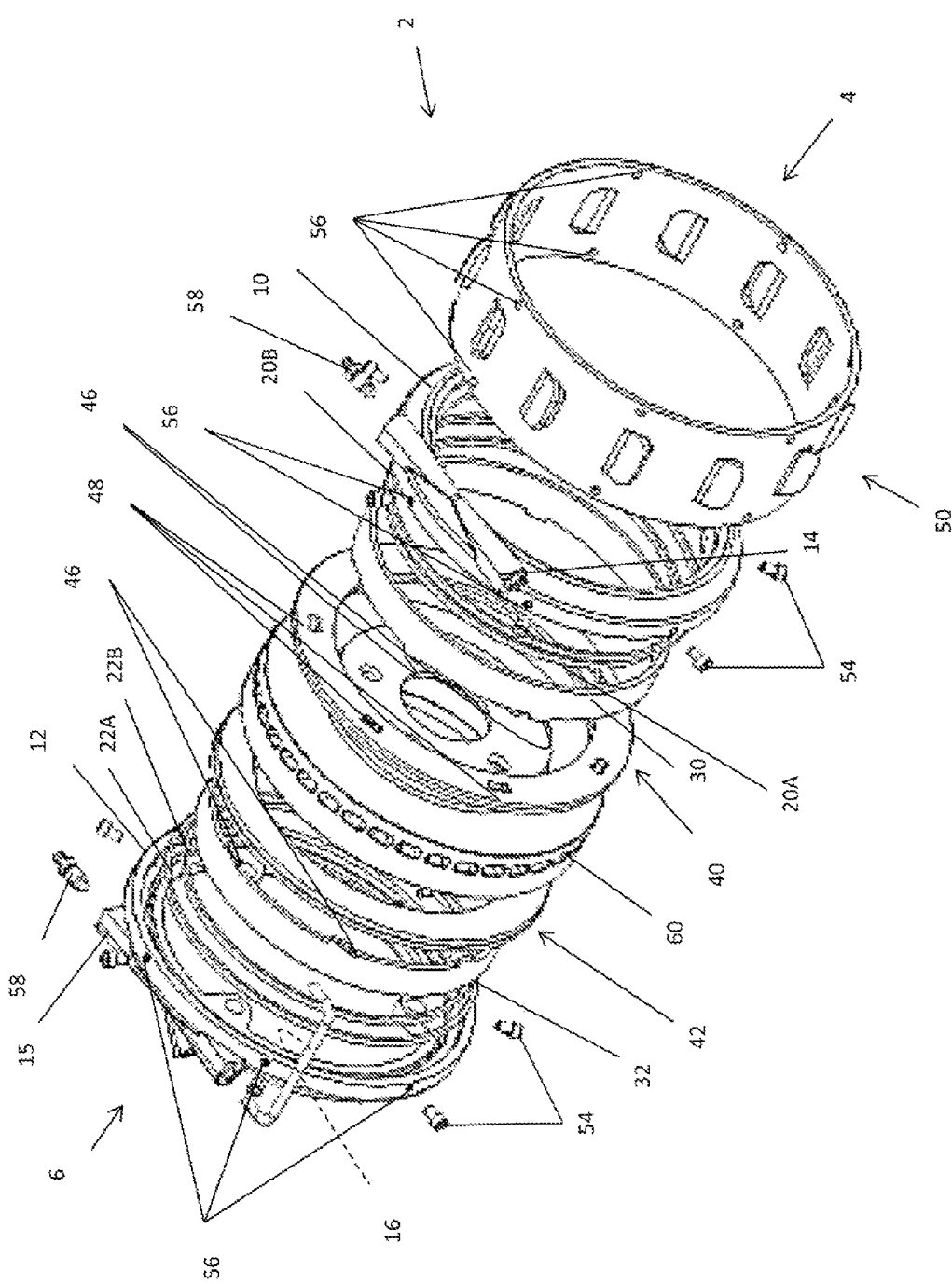
FIG. 5 is an exploded view of FIG. 4.

FIG. 5 illustrates an exploded view of the full contact brake 2 of FIG. 4. The full contact brake 2 includes an outboard side 4 and an inboard side 6. A bridge tube 50 connects the outboard housing 10 to the inboard housing 12. The bridge tube 50 includes a plurality of connection ports 56 on each peripheral edge of the bridge tube that each receives a fastener 54 that extends through the bridge tube 50 to a connection port 56 in the outboard housing 10 or the inboard housing 12 respectively. Both of the outboard housing 10 and the inboard housing 12 include a hydraulic feature 14 and a venting feature 15 that is connected on one side to a bleeder screw 58 and an opposing side to a connection tubing 16 that connects and extends between the outboard housing 10 and the inboard housing 12. The outboard side 4 has an outboard housing 10 that has two seal grooves (not shown) that house an inner diameter outboard seal 20A and an outer diameter outboard seal 20B that extend on both sides of an outboard annular piston 30. The outboard annular piston 30 includes a plurality of male mating features 46 that extend into female mating features 48 in an outboard pad assembly 40 so that the outboard annular piston 30 prevents rotation of the outboard pad assembly 40 during a brake apply. A rotor 60 is located between the outboard pad assembly 40 and the inboard pad assembly 42. The inboard pad assembly 42 includes a plurality of male mating features 46; the inboard pad assembly 42 being located between an inner diameter inboard seal 22A and an outer diameter inboard seal 22B that fit within the inboard housing 12.

Figure 6:
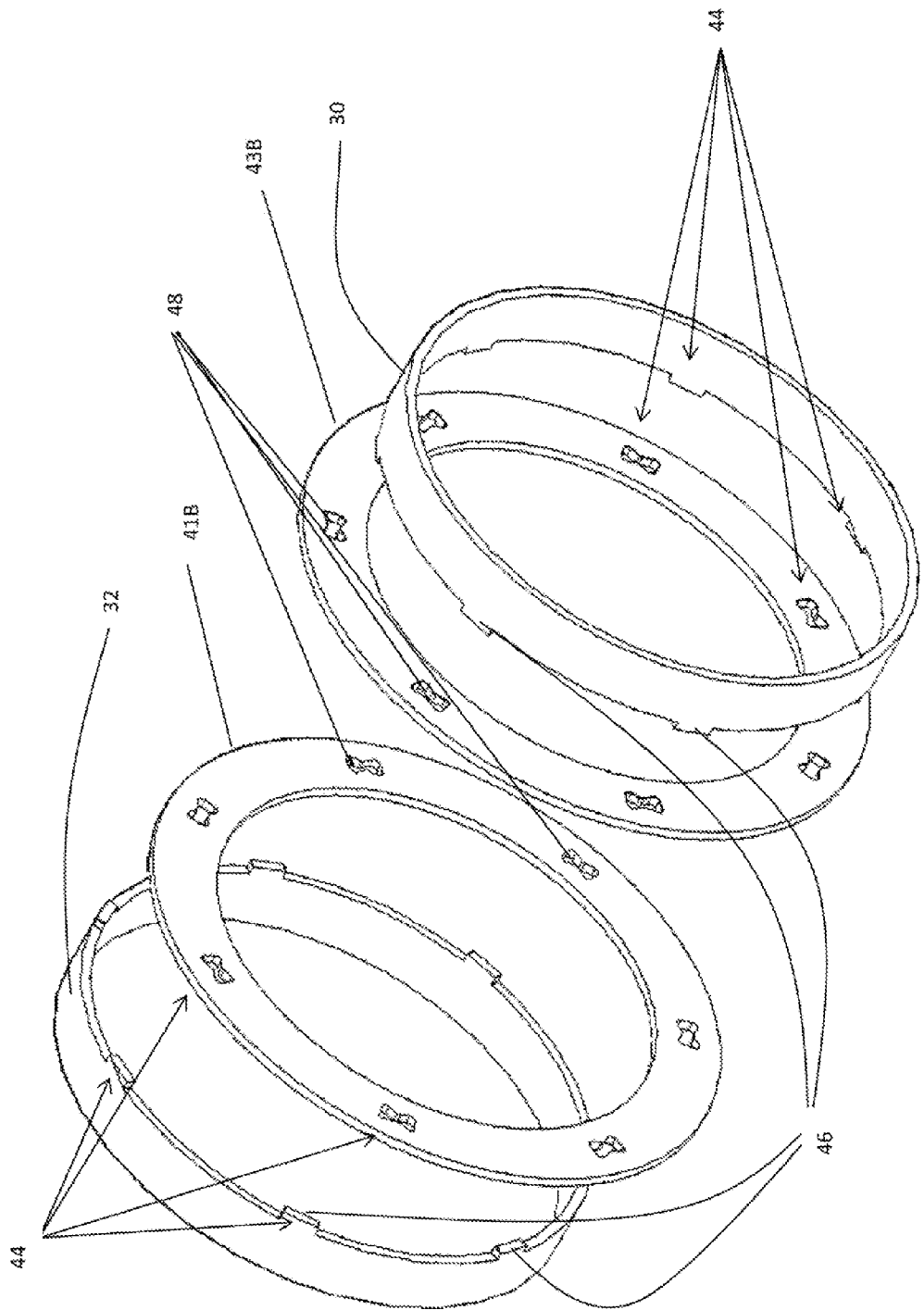
FIG. 6 illustrates an exploded view of a piston and pressure plate so that the mating features are exposed.

FIG. 6 illustrates an exploded view of mating features 44 of the outboard pressure plate 41B and inboard pressure plate 43B and mating features 44 of the outboard annular piston 30 and the inboard annular piston 32. As illustrated, the mating features 44 on the pistons are male mating features 46 (e.g., teeth) and the mating features 44 on the pressure plates are female mating features 48 (e.g., recesses). During a brake apply, the piston is prevented from rotating by the seals (not shown) and the piston prevents movement of the pad assemblies by forming a mating connection with the pressure plates (41B, 43B).

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:
1. A full contact brake comprising:
   a. an inboard housing including:
      i. an inner seal groove, the inner seal groove including a seal. and
      ii. an outer seal groove, the outer seal groove including a seal;
   b. an outboard housing including:
      i. an inner seal groove, the inner seal groove including a seal, and
      ii. an outer seal groove, the outer seal groove including a seal; and
   c. an annular bridge tube located between and connecting the inboard housing to the outboard housing;
   wherein the inboard housing the outboard housing, and the annular bridge tube form a housing that comprises:
      i. an inboard annular piston located between the seal in the inner seal groove and the seal in the outer seal groove in the inboard housing;
      ii. an outboard annular piston located between the seal in the inner seal groove and the seal in the outer seal groove in the outboard housing; and
   a rotor located between the inboard, annular piston and the outboard annular piston so that during a brake apply both the inboard annular piston is moved towards an inboard side of the rotor and the outboard annular piston is moved towards an outboard side of the rotor; and wherein the seal in the inner seal groove and the seal in the outer seal groove of the inboard housing form an interference fit around the inboard annular piston and sandwich the inboard annular piston and the seal in the inner seal groove and the seal in the outer seal groove of the outboard housing form an interference fit around the outboard annular piston and sandwich the outboard annular piston so that rotation of the inboard annular piston and the outboard annular piston respectively are substantially prevented during a brake apply and wherein a force of the interference fit around the inboard annular piston and a force of the interference fit around the outboard annular piston is increased during the brake apply by a proportional increase in hydraulic pressure in the inboard housing and the outboard housing from hydraulic fluid moving into the inboard housing and the outboard housing so that the inboard annular piston and the outboard annular piston are prevented from rotating during the brake apply.

2. The full contact brake of claim 1. wherein, during the brake apply, the hydraulic pressure moves the inboard annular piston and the outboard annular piston respectively and so that the hydraulic pressure forces the seal in the inner seal groove and the seal in the outer seal groove of the inboard housing into contact with the inboard annular piston and the seal in the inner seal groove and the seal in the outer seal groove of the outboard housing into contact with the outboard annular piston so that force of the interference fit is increased during the brake apply.

3. The full contact brake of claim 1, wherein the full contact brake is free of any pad abutments.

4. The full contact brake of claim 1, wherein the full contact brake includes: (a) an inboard brake pad located between the inboard annular piston and the rotor; and (b) an outboard brake pad located between the outboard annular piston and the rotor;

wherein, during the brake apply, the inboard annular piston moves the inboard brake pad into contact with an inboard side of the rotor and the outboard annular piston moves the outboard brake pad into contact with an outboard side of the rotor; and wherein the inboard annular piston and the outboard annular piston each include a mating feature and the inboard brake pad and the outboard brake pad include a mating feature that is complementary to the mating feature of the inboard annular piston and the outboard annular piston respectively so that the mating features form a connection between the inboard annular piston and the inboard brake pad and the outboard annular piston and the outboard brake pad.

5. The full contact brake pad of claim 4, wherein the inboard brake pad and the inboard annular piston are interconnected so that during the brake apply, a brake retract, or a condition therebetween the inboard brake pad moves with the inboard annular piston, and wherein the outboard brake pad and the outboard annular piston are interconnected so that during the brake apply, the brake retract, or a condition therebetween the outboard brake pad moves with the outboard annular piston.

6. The full contact brake of claim 1, wherein the inboard brake pad and the outboard brake pad are an annular ring and the inboard brake pad and the outboard brake pad are substantially the same size as the rotor so that during a brake apply an inboard surface and an outboard surface of the rotor respectively are contacted by the inboard brake pad and the outboard brake pad.

7. The full contact brake of claim 4, wherein the inboard annular piston, the outboard annular piston or both include a plurality of mating features.

8. The full contact brake of claim 7, wherein the inboard brake pad, the outboard brake pad or both includes a plurality of mating features that correspond to the plurality of mating features of the inboard annular piston, the outboard annular piston, or both so that during a brake apply the plurality of mating features of the inboard annular piston, the outboard annular piston, or both contact the plurality of mating features of the outboard brake pad, the inboard brake pad, or both preventing rotation of the inboard brake pad, the outboard brake pad, or both during a brake apply, a brake retract, or running, and wherein the plurality of mating features of the inboard annular piston, the outboard annular piston, or both are teeth and the plurality of mating features on the inboard brake pad, the outboard brake pad, or both are recesses.

9. The full contact brake of claim 1, wherein the inboard housing, the outboard housing, or both include at least one connection pipe for introducing a fluid into the housing during a brake apply.

10. The full contact brake of claim 9, wherein at least one flexible pipe is connected to the at least one connection pipe of both the inboard housing and the outboard housing.

11. The full contact brake of claim 4, wherein the inboard annular piston is normal to the inboard brake pad and the outboard annular piston is normal to the outboard brake pad.

12. The full contact brake of claim 1, wherein the full brake is free of any pad clips.

13. The full contact brake of claim 1, wherein the rotor is a fixed rotor.

14. The full contact brake of claim 1, wherein the full contact brake is configured to connect to a knuckle of a vehicle.

15. The full contact brake of claim 1, wherein the inboard annular piston and the outboard annular piston are annular tubes.

16. A full contact brake comprising:
  i. an inboard housing including:
    i. an inner seal groove, the inner seal groove, including a seal, and
    ii. an outer seal groove, the outer seal groove including a seal;
  ii. an outboard housing including:
    i. an inner seal groove, the inner seal groove including a seal, and
    ii. an outer seal groove, the outer seal groove including a seal; and
  iii. an annular bridge tube located between and connecting the inboard housing to the outboard housing, the annular bridge tube including a plurality of windows around a circumference of the annular bridge tube;
  wherein the inboard housing, the outboard housing, and the annular bridge tube forms a housing that consists essentially of:
    i. an inboard piston located between the seal in the inner seal groove and the seal in the outer seal groove in the inboard housing;
    ii. an outboard piston located between the seal in the inner seal groove and the seal in the outer seal groove in the outboard housing;
    iii. a rotor located between the inboard piston and the outboard piston;
    iv. an inboard brake pad located between the inboard piston and the rotor; and v. an outboard brake pad located between the outboard piston and the rotor;

wherein, during a brake apply, the inboard piston moves the inboard brake pad into contact with an inboard side of the rotor and the outboard piston moves the outboard brake pad into contact with an outboard side of the rotor; and wherein the seal in the inner seal groove and the seal in the outer seal groove of the inboard housing form an interference fit around the inboard piston and the seal in the inner seal groove and the seal in the outer seal groove of the outboard housing form an interfere fit around the outboard piston so that rotation of the inboard piston and the outboard piston respectively are substantially prevented during the brake apply, and wherein during the brake apply, hydraulic fluid is moved into the inboard housing and the outboard housing creating hydraulic pressure in the inboard housing and the outboard housing so that the hydraulic pressure moves the inboard piston and the outboard piston respectively and wherein hydraulic pressure forces the seal in the inner seal groove and the seal in the outer seal groove of the inboard housing into contact with the inboard piston and the seal in the inner seal groove and the seal in the outer seal groove of the outboard housing into contact with the outboard piston so that force of the interference fit is increased during the brake apply by a proportional increase in the hydraulic pressure so that the inboard piston and the outboard piston, respectively are prevented from rotating during the brake apply.

17. The full contact brake pad of claim 16, wherein the inboard brake pad and the inboard piston are interconnected so that during a brake apply, a brake retract, or a condition therebetween the inboard brake pad moves with the inboard piston, and wherein the outboard brake pad and the outboard piston are interconnected so that during a brake apply, a brake retract, or a condition therebetween the outboard brake pad moves with the outboard piston.

18. The full contact brake of claim 17, wherein the inboard brake pad and the inboard piston and the outboard brake pad and the outboard piston are interconnected by a plurality of teeth.

19. The full contact brake pad of claim 17, wherein the housing is free of any brake pad abutments.

20. The full contact brake pad of claim 17, wherein the interconnection between the inboard piston and the inboard brake pad is temporary and the interconnection between the outboard piston and the outboard brake pad is temporary so that the interconnections are formed only during a deceleration event.

* * * * *

UNITED STATES PATENT AND TRADEMARK OFFICE
CERTIFICATE OF CORRECTION

Page 1 of 1

PATENT NO.        : 9,091,313 B2
APPLICATION NO.   : 14/010917
DATED             : July 28, 2015
INVENTOR(S)       : Chelaidite et al.

It is certified that error appears in the above-identified patent and that said Letters Patent is hereby corrected as shown below:

In the Claims

Column 16, Line 29, insert --contact-- after full (Second Occurrence)

Signed and Sealed this
Fifteenth Day of December, 2015

Michelle K. Lee
*Director of the United States Patent and Trademark Office*